(12) United States Patent
Cherian et al.

(10) Patent No.: US 10,219,299 B2
(45) Date of Patent: Feb. 26, 2019

(54) CHANNEL AWARE RESOURCE ALLOCATION

(71) Applicant: QUALCOMM Incorporated, San Diego, CA (US)

(72) Inventors: George Cherian, San Diego, CA (US); Simone Merlin, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/399,610

(22) Filed: Jan. 5, 2017

(65) Prior Publication Data

US 2017/0202020 A1    Jul. 13, 2017

Related U.S. Application Data

(60) Provisional application No. 62/276,768, filed on Jan. 8, 2016.

(51) Int. Cl.
*H04W 4/00* (2018.01)
*H04W 74/08* (2009.01)
*H04W 74/00* (2009.01)
*H04W 72/04* (2009.01)
*H04L 5/00* (2006.01)

(52) U.S. Cl.
CPC ....... *H04W 74/0808* (2013.01); *H04L 5/0053* (2013.01); *H04W 72/044* (2013.01); *H04W 72/0413* (2013.01); *H04W 74/004* (2013.01)

(58) Field of Classification Search
None
See application file for complete search history.

(56) References Cited

U.S. PATENT DOCUMENTS

2012/0147831 A1* 6/2012 Golitschek ............ H04L 1/0026
                                                     370/329
2017/0048880 A1* 2/2017 Anderson ......... H04W 72/1226

FOREIGN PATENT DOCUMENTS

EP        2282575 A1    2/2011
WO     2014074832 A1    5/2014

OTHER PUBLICATIONS

International Search Report and Written Opinion—PCT/US2017/012612—ISA/EPO—dated Apr. 3, 2017.

* cited by examiner

*Primary Examiner* — Minh Trang T Nguyen
(74) *Attorney, Agent, or Firm* — Arent Fox, LLP

(57) ABSTRACT

A method, an apparatus, and a computer-readable medium for wireless communication are provided. In one aspect, an apparatus is configured transmit, to a set of stations, a trigger frame that indicates a set of RUs for uplink and/or downlink transmission available to each station of the set of stations. The trigger frame may be a request for feedback on the set of RUs from each station. The apparatus may be configured to receive from each station a response frame over an uplink resource based on the transmitted trigger frame. The response frame may include the feedback on the set of RUs and may be received independent of a channel condition associated with the uplink resource. The feedback may be an ordered list of RUs based on the set of RUs.

17 Claims, 9 Drawing Sheets

CHANNEL AWARE RESOURCE ALLOCATION

CROSS-REFERENCE TO RELATED APPLICATION(S)

This application claims the benefit of U.S. Provisional Application Ser. No. 62/276,768, entitled "CQI/CCA AWARE RESOURCE ALLOCATION" and filed on Jan. 8, 2016, which is expressly incorporated by reference herein in its entirety.

BACKGROUND

Field

The present disclosure relates generally to communication systems, and more particularly, to allocating resources based on channel quality information (CQI) and clear channel assessment (CCA) protocols.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., an access point) for wireless communication. The apparatus may be configured to transmit, to a set of stations, a control frame that indicates a set of resource units for uplink transmission available to each station of the set of stations. The control frame may be a request for feedback on the set of resource units (RUs) from each station. The apparatus may be configured to receive from each station a response frame over an uplink resource based on the transmitted control frame. The response frame may include the feedback on the set of RUs and may be received independent of a channel condition associated with the uplink resource. The feedback may be an ordered list of RUs based on the set of RUs.

Another aspect of this disclosure provides an apparatus (e.g., a station) for wireless communication. The apparatus may be configured to receive from an access point a control frame that indicates a set of resource units available to the station for uplink transmission. The control frame may be a request for feedback on the set of RUs. The apparatus may be configured to determine feedback on the set of RUs based on channel conditions associated with the set of RUs indicated in the control frame. The apparatus may be configured to transmit a response frame on an uplink resource allocated to the station. The response frame may include the determined feedback and may be transmitted independent of a channel condition associated with the uplink resource.

In another aspect, a method for wireless communication is provided. The method may include receiving from an access point a trigger frame that indicates a set of RUs available to the station for uplink transmission, in which the trigger frame is a request for feedback on the set of RUs. The method may include determining feedback on the set of RUs based on channel conditions associated with the set of RUs indicated in the trigger frame and transmitting a response frame on an uplink resource allocated to the station, in which the response frame includes the determined feedback and is transmitted independent of a channel condition associated with the uplink resource. In an instance, the determining the feedback may include determining a respective channel condition associated with each RU of the set of RUs, the respective channel condition being based on a CCA determination, a NAV setting, or CQI and determining a list of RUs ordered based on the respective channel condition associated with each RU of the set of RUs. In another instance, the determining the feedback may further include determining a preferred MCS for at least one RU in the set of RUs. In another instance, the channel condition associated with the uplink resource may indicate a channel associated with the uplink resource is busy based on one of a CCA determination, a NAV setting, an ED level being above a first threshold, or a CQI being below a second threshold. The response frame is transmitted on the uplink resource while the channel is busy. In another instance, the method may include receiving a second trigger frame indicating a subset of RUs allocated to the station for uplink transmission. The subset of RUs may be based on the determined feedback transmitted to the access point.

In another aspect, an apparatus (e.g., a station) for wireless communication is provided. The apparatus may include means for receiving from an access point a trigger frame that indicates a set of RUs available to the station for uplink transmission, wherein the trigger frame is a request for feedback on the set of RUs, means for determining feedback on the set of RUs based on channel conditions associated with the set of RUs indicated in the trigger frame, and means for transmitting a response frame on an uplink resource allocated to the station, in which the response frame includes the determined feedback and is transmitted independent of a channel condition associated with the uplink resource.

In another aspect, an apparatus (e.g., a station) for wireless communication is provided. The apparatus may include memory and at least one processor coupled to the memory. The at least one processor may be configured to receive from an access point a trigger frame that indicates a set of RUs available to the station for uplink transmission, in which the trigger frame is a request for feedback on the set of RUs, to determine feedback on the set of RUs based on channel conditions associated with the set of RUs indicated in the trigger frame, and to transmit a response frame on an uplink resource allocated to the station, in which the response frame includes the determined feedback and is transmitted independent of a channel condition associated with the uplink resource.

In another aspect, a computer-readable medium of a station storing computer executable code. The computer-readable medium may include code to receive from an access point a trigger frame that indicates a set of RUs available to the station for uplink transmission, in which the trigger frame is a request for feedback on the set of RUs, to determine feedback on the set of RUs based on channel conditions associated with the set of RUs indicated in the trigger frame, and to transmit a response frame on an uplink resource allocated to the station, in which the response frame includes the determined feedback and is transmitted independent of a channel condition associated with the uplink resource.

DETAILED DESCRIPTION

Figure 1:
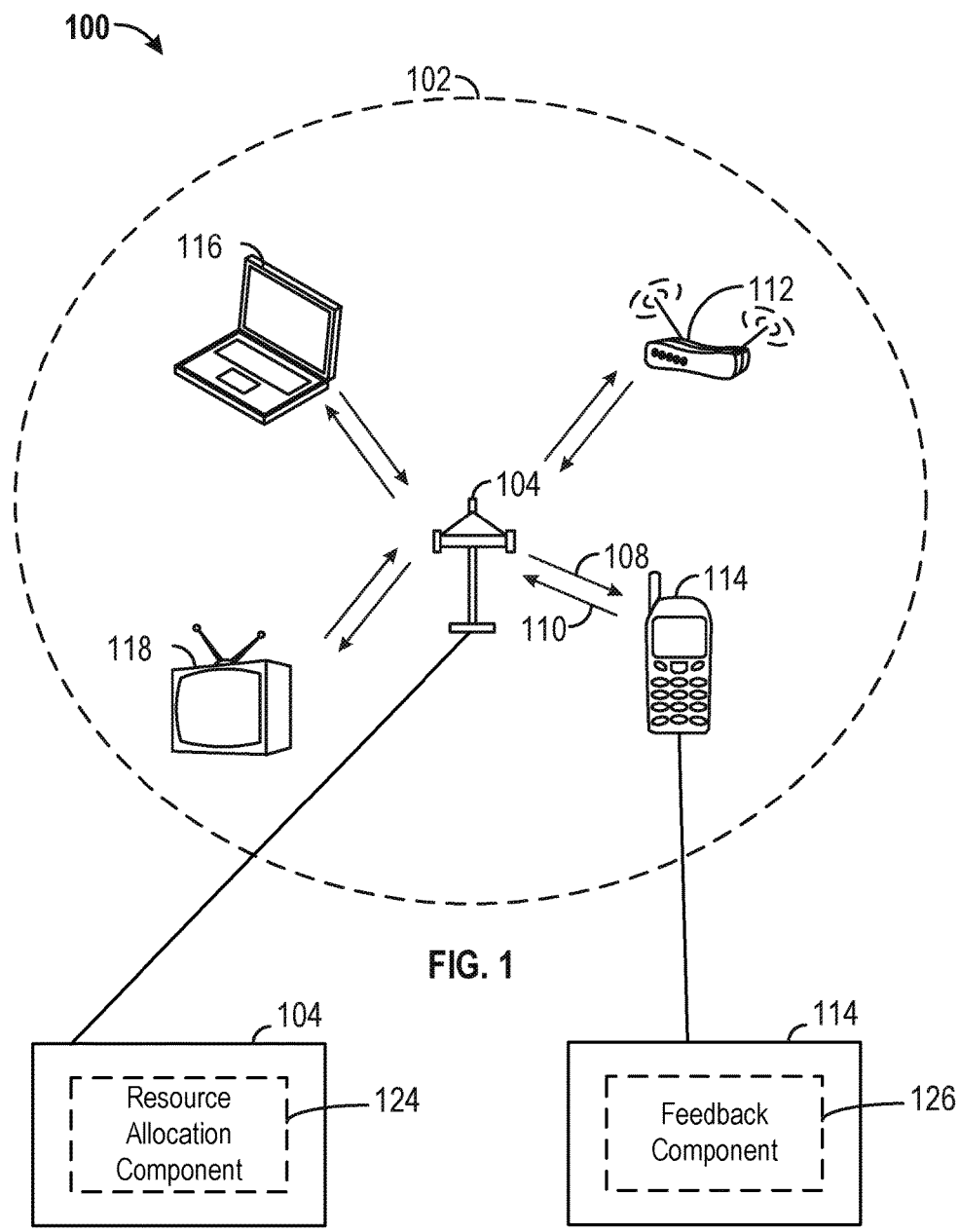
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a resource allocation component 124 to perform procedures related to allocating resource for MU transmission based on feedback information. In this example, the resource allocation component 124 may be configured to transmit, to a set of stations, a control frame that indicates a set of resource units for uplink transmission available to each station of the set of stations. The control frame may be a request for feedback on the set of RUs from each station. The resource allocation component 124 may be configured to receive from each station a response frame over an uplink resource based on the transmitted control frame. The response frame may include the feedback on the set of RUs and may be received independent of a channel condition associated with the uplink resource. The feedback may be an ordered list of RUs based on the set of RUs.

In another aspect, the STA 114 may include one or more components for performing various functions. For example, the STA 114 may include a feedback component 126 to perform procedures related to providing feedback on resource units available for MU transmission. In this example, the feedback component 126 may be configured to receive from an access point a control frame that indicates a set of resource units available to the station for uplink transmission. The control frame may be a request for feedback on the set of RUs. The feedback component 126 may be configured to determine feedback on the set of RUs based on channel conditions associated with the set of RUs indicated in the control frame. The feedback component 126 may be configured to transmit a response frame on an uplink resource allocated to the station. The response frame may include the determined feedback and may be transmitted independent of a channel condition associated with the uplink resource.

In a Wi-Fi network, wireless devices such as APs and STAs may perform a clear channel assessment (CCA) to determine whether a transmission channel is busy or idle for purposes of determining whether data may be transmitted to another wireless device. A CCA has two components: carriers sense (CS) and energy detection. Carrier sense refers to an ability of a wireless device (e.g., AP or STA) to detect and decode incoming Wi-Fi signal preambles, signals which enable the receiver to acquire a wireless signal from and synchronize with the transmitter, from other wireless devices. For example, a first AP may broadcast a Wi-Fi signal preamble, and the Wi-Fi signal preamble may be detected by a second AP or a STA. Similarly, a third AP may broadcast a Wi-Fi signal preamble, and the Wi-Fi signal preamble may be detected by the second AP. When the second AP detects one or more of the Wi-Fi signal preambles, the second AP may determine that the transmission channel is busy and not transmit data. The CCA may remain busy for the length of a transmission frame associated with the Wi-Fi signal preambles.

The second component of CCA is energy detection, which refers to the ability of a wireless device to detect an energy level present on a transmission channel. The energy level may be based on different interference sources, Wi-Fi transmissions, a noise floor, and/or ambient energy. Wi-Fi transmissions may include unidentifiable Wi-Fi transmissions that have been corrupted or are so weak that the transmission can no longer be decoded. Unlike carrier sense, in which the exact length of time for which a transmission channel is busy may be known, energy detection uses periodic sampling of a transmission channel to determine if the energy still exists. Additionally, energy detection may require at least one threshold used to determine whether the reported energy level is adequate to report the transmission channel as busy or idle. This energy level may be referred to as the ED level/ED threshold level or the CCA sensitivity level. For example, if an ED level is above a threshold, a wireless device may defer to other devices by refraining from transmitting.

In wireless networks, an AP may transmit a control frame (e.g., a trigger frame) to STAs to indicate a set of resource units (RUs) allocated to the STAs for uplink transmission (e.g., uplink multi-user (UL MU) transmission) and/or for DL MU transmission. In an aspect, STAs may consider the CCA status associated with the set of RUs in determining whether to transmit on any of the RUs indicated in the control frame. If the CCA status indicates that the channel is busy with respect to the allocated set of RUs, then the STA may not transmit on the set of RUs. In another aspect, STAs may consider the network allocation vector (NAV) setting for the time during which the allocated RUs are available to determine whether the channel is busy. In another aspect, the STAs may consider the channel quality information (CQI) associated with the allocated RUs to determine whether to transmit on the allocated RUs. In one example, when the CCA status and/or the NAV setting indicates that a channel is busy or the CQI indicates that the channel conditions are poor, the STA may not respond to the trigger frame and/or may not use the allocated RUs for transmission. As such, available resource units that have been allocated to STAs may be left unused. A need exists to reduce the number allocated RUs that are unused.

Figure 2:
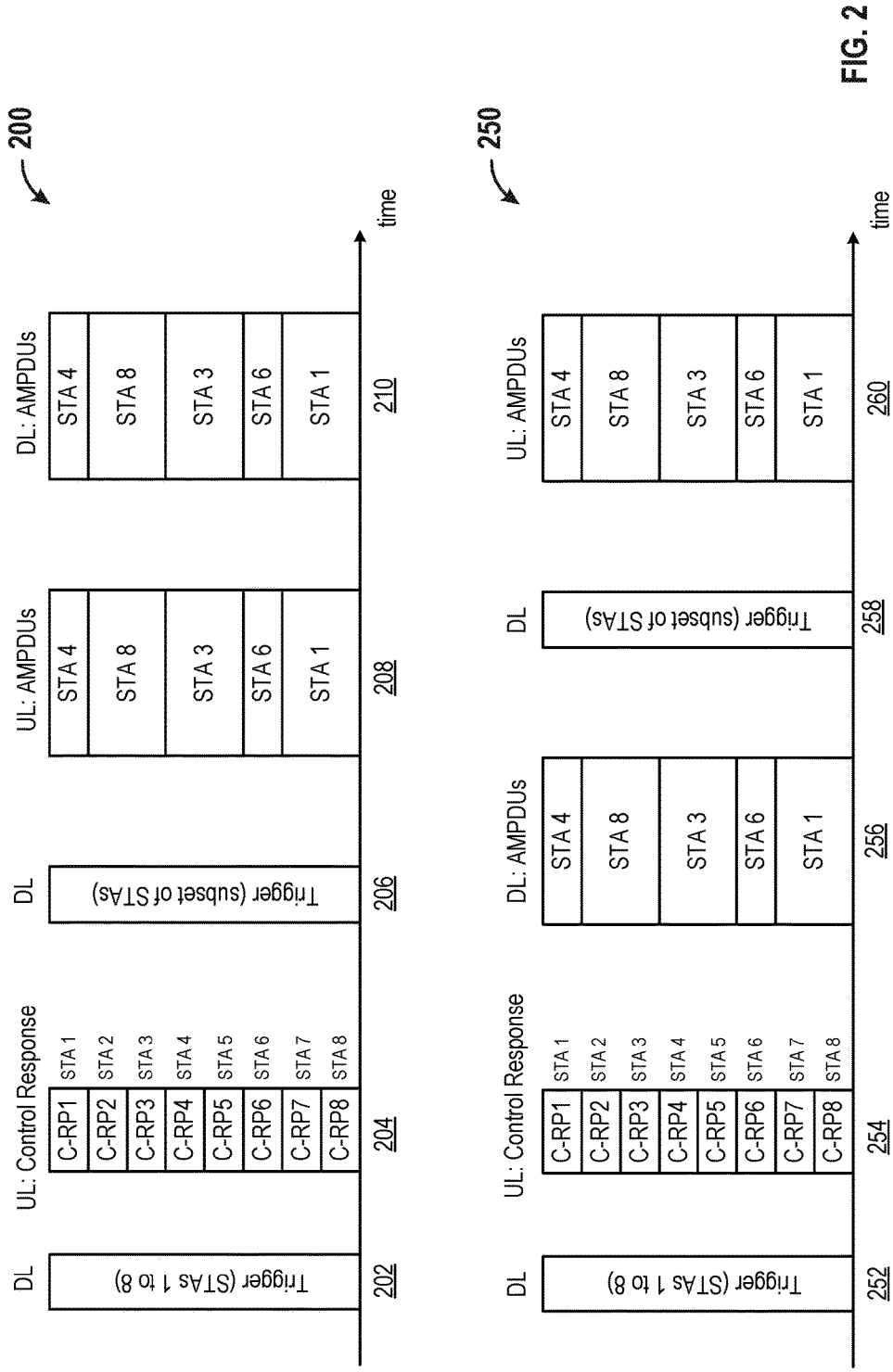
FIG. 2 illustrates exemplary diagrams of methods for MU resource allocation based on channel conditions.

FIG. 2 illustrates exemplary diagrams 200, 250 of methods for MU resource allocation based on channel conditions. Referring to diagram 200, an AP may serve STAs 1-8 within a BSA. The AP may determine a set of resource units that may be allocated to the STAs 1-8 for UL MU and/or DL MU transmissions. For example, the AP may identify resource units not being used and allocate a subset of the resource units for UL and/or DL MU transmission. At 202, the AP may transmit a first trigger frame (or another DL/UL MU control frame) via a DL transmission to the STAs 1-8. The first trigger frame may indicate a set of resource units for UL MU transmission available to the STAs 1-8. In an aspect, the first trigger frame may include identifiers associated with each of the STAs 1-8 to indicate that the first trigger frame is intended for the STAs 1-8. The first trigger frame may indicate a separate set of RUs for each of the STAs 1-8. In an aspect, the first trigger frame may represent a request for feedback on the set of RUs available to each STA. The AP may utilize the first trigger frame to poll for feedback in a control response frame (e.g., client connection quality (CCQ) feedback and/or CQI feedback). In an aspect, the control response frame may be a variant of a high-efficiency aggregation (HE-A) control frame or an enhanced clear to send (E-CTS) frame. For example, the first trigger frame may include a feedback request bit. When the feedback request bit is set to 1, the first trigger frame may represent a request for feedback information associated with resource units indicated in the first trigger frame. When the feedback request bit is set to 0, the first trigger frame may not request feedback information associated with the resource units indicated in the first trigger frame.

Upon receiving the first trigger frame, each of the STAs 1-8 may determine the set of RUs allocated to each respective STA as indicated in the first trigger frame. Assuming the first trigger frame is a request for feedback, each STA may determine feedback on the available set of RUs indicated in the first trigger frame, including the RUs allocated to other STAs within the first trigger frame. In one example, STA 1 may determine the set of RUs allocated to STA 1. In one aspect, STA 1 may perform a CCA on the set of RUs allocated to the STA 1. In this aspect, the STA 1 may measure an energy level on the set of resource units to determine if the measured energy level is above an energy detection level threshold or may determine if any preambles have been detected on the set of resource units. The STA 1 may determine that at least some of the RUs in the set of RUs clear the CCA (e.g., the measured energy level for at least some of the RUs is below an energy detection level threshold and/or no preambles were detected on at least some of the RUs). In another aspect, the STA 1 may determine if the channel is busy for the set of RUs based on a NAV setting in the STA 1. In yet another aspect, the STA 1 may measure the CQI for each RU in the set of RUs, including RUs allocated to other STAs (e.g., STAs 2-8 within the first trigger frame). Based on the foregoing, the STA 1 may determine one or more RUs in the set of RUs that cleared CCA and/or is not in use based on the NAV setting. The one or more RUs that cleared CCA may represent RUs that will be used by the STA 1. Further, the STA 1 may also measure the CQI for each of the one or more RUs.

At 204, the STA 1 may transmit an indication of the one or more RUs to the AP in a control response (C-RP) frame. In the control response frame, the one or more RUs may be listed in order of preference from a CQI standpoint. For example, the first RU listed may have the highest CQI and the last RU listed may have the lowest CQI. In another aspect, for DL MU resource units, the STA 1 may further determine a preferred MCS to be used for receiving data on the RUs and transmit the preferred MCS associated with each RU in the control response frame.

The STA 1 may transmit the control response frame on an uplink resource indicated in the first trigger frame. In an aspect, the uplink resource may be one of the resources units indicated in the set of RUs. In another aspect, the uplink resource may be a dedicated RU for transmitting the control response frame. When transmitting the control response frame on the uplink resource, the STA 1 may ignore CCA, NAV settings, and/or CQI information associated with the uplink resource. For example, even when the uplink resource does not clear CCA (e.g., preambles detected on the uplink resource or the measured energy level is above a threshold), when transmitting on the uplink resource may interference with another ongoing transmission based on the NAV setting, or when the uplink resource is associated with a channel that has poor channel quality, the STA 1 may still transmit the control response frame to the AP to provide feedback on the set of RUs. In other words, the transmission of the control response frame on the uplink resource may be independent of the channel status associated with the uplink resource, and therefore, the control response frame may be transmitted even when the channel associated with the uplink resource is busy.

Referring to the diagram 200, STAs 3, 4, 6, 8 may similarly determine one or more RUs indicated in the first trigger frame that clears CCA. Furthermore, the STAs 3, 4, 6, and 8 may also transmit a respective control response frame, at 204, to the AP. Each of the respective control response frames may indicate the one or more RUs that cleared CCA and the one or more RUs may be listed in order of preference (e.g., based on a CQI). The STAs 2, 5, 7, 9, however, may determine that none of the RUs indicated in the set of RUs available to the STAs 2, 5, 7, 9 clears CCA (or is available according to the NAV setting). Accordingly, the STAs 2, 5, 7, 9 may each transmit a respective control response frame to the AP indicating that the STAs 2, 5, 7, 9 will not transmit on any of the resources indicated in the first trigger frame.

After receiving the various control response frames from STAs 1-8 containing feedback on the sets of RUs, the AP may determine a subset of the STAs to be scheduled for UL MU transmission. As discussed above, the STAs 2, 5, 7, 9 may indicate that the STAs 2, 5, 7, 9 will not transmit on the respective sets of RUs (e.g., because the RUs did not clear CCA or because the STAs no longer have data to transmit). From each of the STAs 1, 3, 4, 6, 8, the AP may receive a respective ordered list of RUs indicating a preference associated with one or more RUs on which the STAs may transmit. Based on the received feedback, the AP may select the subset of STAs 1, 3, 4, 6, 8 that have indicated one or more RUs that have cleared CCA. The AP may allocate an updated set of RUs by determining RU locations and the RU sizes to be allocated to the STAs 1, 3, 4, 6, 8 based on the preferences indicated by each STA in the ordered list.

In an aspect, the ordered list of RUs may be a channel availability bitmap. The channel availability map include an ordered list of RUs (e.g., 20 MHz channels, 40 MHz channels, 80 MHz channels, or 160 MHz channels). When a bit corresponding to an RU is set to 1, for example, then the RU may be available to the STA 1 based on the channel measurements. When the corresponding bit is set to 0, then the RU may not be available to the STA 1.

Based on the updated RU allocation, at 206, the AP may send a second trigger frame for the STAs 1, 3, 4, 6, 8 indicating the subset of RUs allocated to the STAs 1, 3, 4, 6, 8. As shown in the diagram 200, the STAs 1, 3, 8 may be allocated more RUs than the STAs 4, 6 because the CQI with respect to STAs 1, 3, 8 for certain RUs may be better than the CQI for the STAs 4, 6. As such, the AP may allocate a greater amount of RUs to STAs that have better channel quality.

At 208, after receiving the second trigger frame, the STAs 1, 3, 4, 6, 8 may transmit UL data to the AP based on the updated resource allocation indicated in the second trigger frame. In an aspect, the UL data may be transmitted in aggregated medium access control (MAC) protocol data units (AMPDUs). At 210, the STAs 1, 3, 4, 6, 8 may receive DL AMPDUs from the AP based on the set of resources indicated in the first trigger frame and/or the second trigger frame.

In an aspect, the AP may not have sufficient time to generate the second trigger frame for UL based on the reported RU preferences of the STAs. In this aspect, the AP may reserve more time for generating the second trigger frame by first transmitting a DL MU frame before sending the second trigger frame as shown in the diagram 250.

Referring to diagram 250 of FIG. 2, at 252, the AP may send a first trigger frame to the STAs 1-8 indicating the set of RUs available to the STAs 1-8 for UL and/or DL MU transmissions. Upon receiving the first trigger frame, the STAs 1-8 may determine whether one or more RUs in the set of RUs clears CCA, and if so, order the one or more RUs according to a measured CQI associated with the one or more RUs. At 254, the STAs 1-8 may each transmit a control response frame to the AP. The AP may receive the control response frames from the STAs 1-8. Each control response frame may indicate one or more resources units within the set of RUs that cleared CCA. If multiple RUs are indicated in the control response frame, the RUs may also be ordered based on a CQI measurement or preference for the STA. In an aspect, the AP may not have sufficient time to generate the second trigger frame (e.g., time-sensitive DL data is ready to be transmitted). As such, at 256, the AP may first transmit DL packets to the STAs (e.g., STAs 1, 3, 4, 6, 8) based on DL resources indicated in the first trigger frame. Subsequently, the AP may determine the UL resource allocation in a manner similar with respect to the UL resource allocation discussed with respect to diagram 200. After determining the resource allocation based on the feedback received at 254, the AP may transmit a second trigger frame at 258 to the subset of STAs (e.g., STAs 1, 3, 4, 6, 8). The subset of STAs may receive the second trigger frame and, at 260, transmit UL data to the AP.

Figure 3:
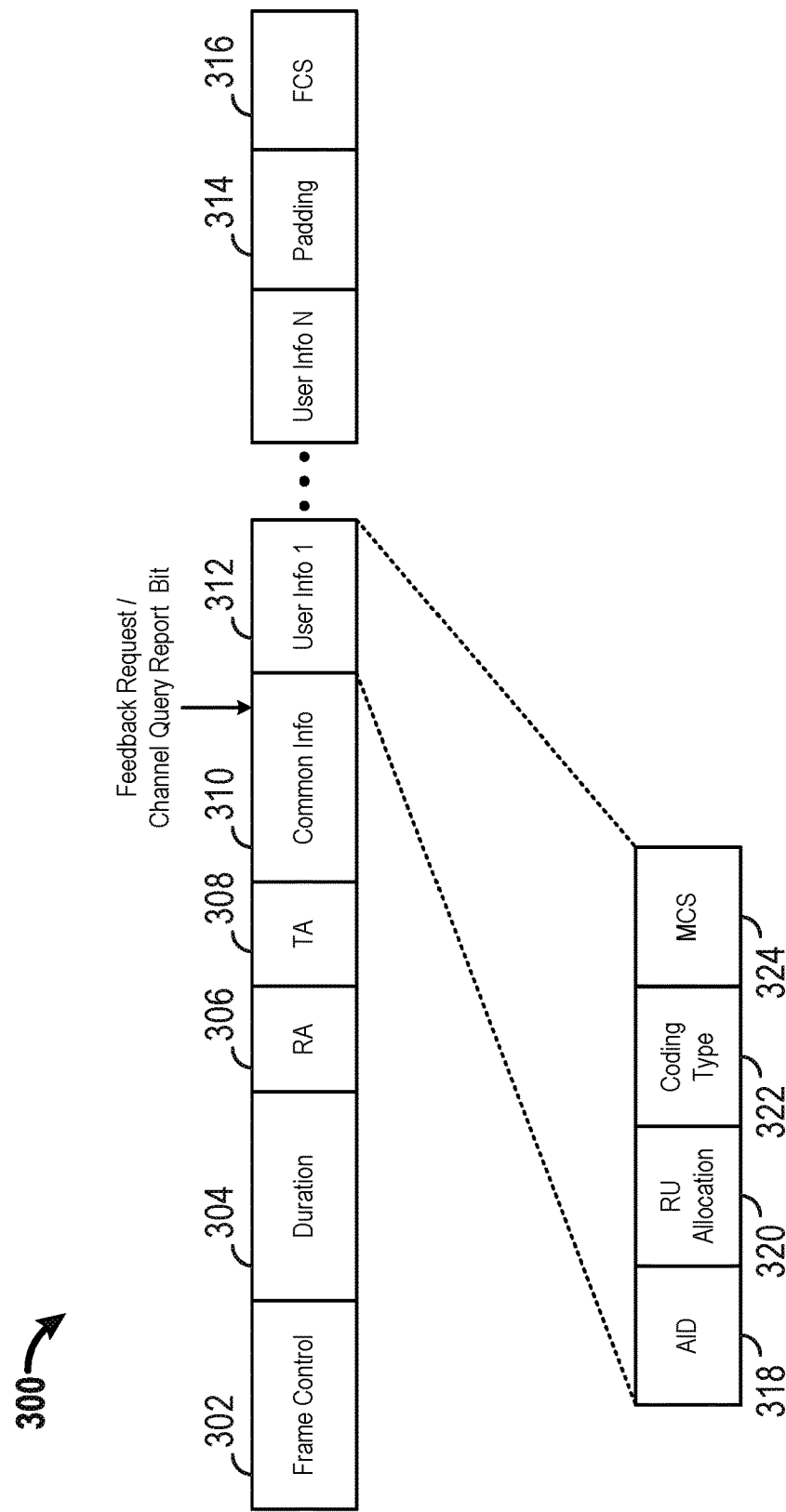
FIG. 3 illustrates an exemplary trigger frame 300 for requesting RU feedback.

FIG. 3 illustrates an exemplary trigger frame 300 for requesting RU feedback. The trigger frame 300 may be used to solicit feedback on resources for DL and UL MU transmission. The trigger frame may include a frame control field 302, a duration field 304, a receiver address (RA) field 306 (or multiple RA fields), a transmit address (TA) field 308, a common info field 310, one or more user info fields 312, a padding 314, and a frame check sequence 316. The RA field 306 may identify the address of the recipient STA. If the trigger frame 300 has one recipient STA, then the RA field 306 is the MAC address of the STA (e.g., the STA 1 in FIG. 2). If the trigger frame 300 has multiple recipient STAs, then the RA field 306 may include a broadcast address. The TA field 308 may include the address of the device transmitting the trigger frame (e.g., the AP). The common info field 310 may include a number of subfields. In an aspect, the common info field 310 may indicate whether the trigger frame 300 requests a report on RU feedback. For example, the common info field 310 may include a feedback request bit used to indicate whether the AP requests feedback on the RUs. In another aspect, the feedback request bit may be included in any other field within the trigger frame 300. For example, each of the one or more user info fields 312 may include a feedback request bit directed to each separate STA. In another aspect, the feedback request bit may indicate that the trigger frame 300 is of a type that queries or requests feedback on allocated RUs.

Referring to FIG. 3, a user info field may include an association ID (AID) subfield 318, an RU allocation subfield 320, a coding type subfield 322, an MCS subfield 324, and other subfields. The AID subfield 318 may identify the user for which the user info field is intended. The RU allocation subfield 320 may indicate one or more resource units allocated to the STA identified in the AID subfield 318. The coding type subfield 322 indicates the code type (e.g., binary convolution coding or low-density parity-check coding). The MCS subfield 324 may indicate the MCS assigned to the STA identified in the AID subfield 318. The padding subfield 314 extends the frame length to give the recipient STA more time to prepare a response. The FCS subfield 316 enables error detection of the trigger frame 300.

Figure 4:
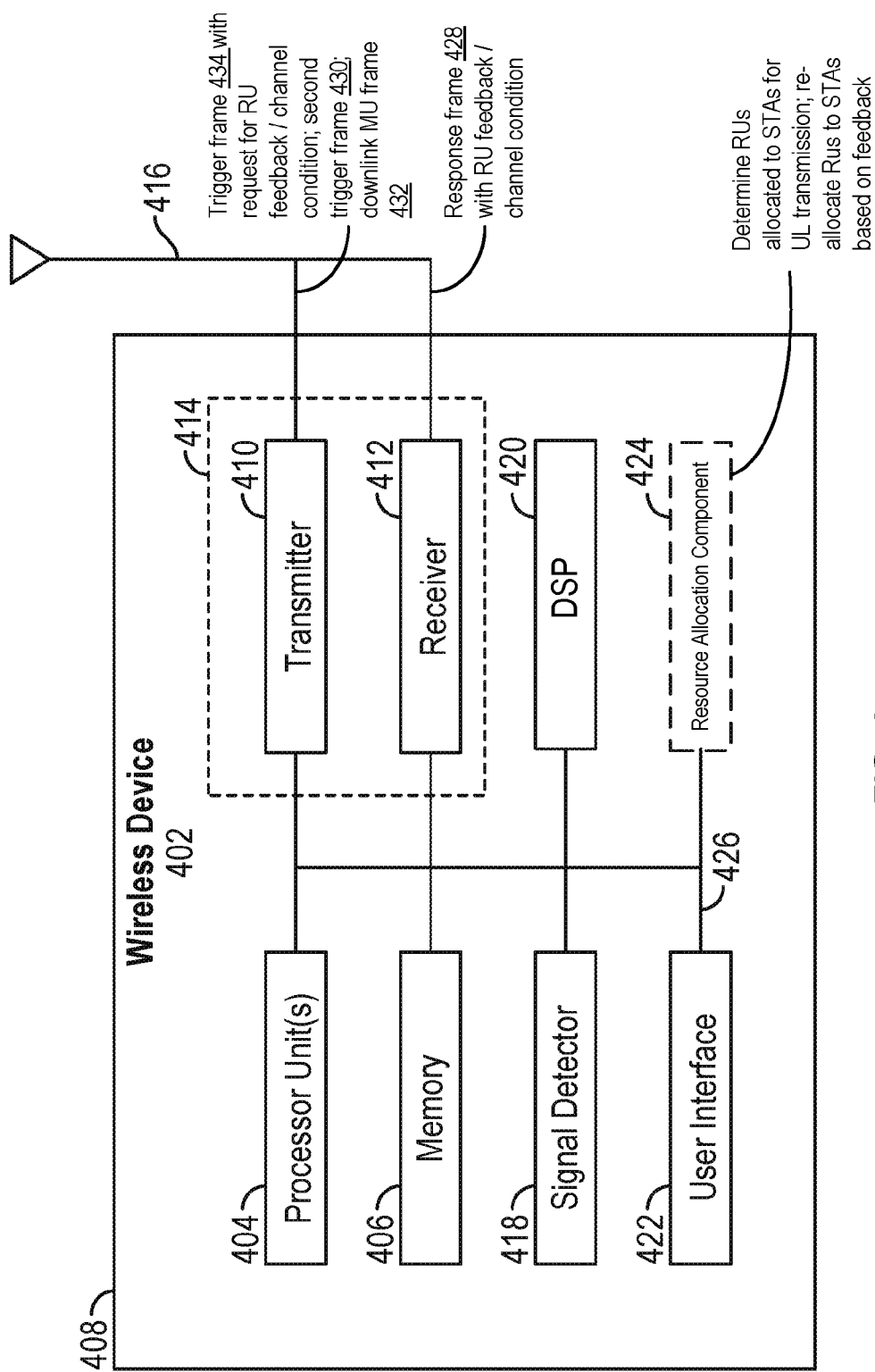
FIG. 4 shows an example functional block diagram of a wireless device that solicits feedback for resource allocation within the wireless communication system of FIG. 1.

FIG. 4 shows an example functional block diagram of a wireless device 402 that solicits feedback for resource allocation within the wireless communication system 100 of FIG. 1. The wireless device 402 is an example of a device that may be configured to implement the various methods described herein. For example, the wireless device 402 may comprise an AP (e.g., the AP 104).

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable (by the processor 404, for example) to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408, and the wireless device 402 may include a transmitter 410 and/or a receiver 412 to allow transmission and reception of data between the wireless device 402 and a remote device. The transmitter 410 and the receiver 412 may be combined into a transceiver 414. An antenna 416 may be attached to the housing 408 and electrically coupled to the transceiver 414. The wireless device 402 may also include multiple transmitters, multiple receivers, multiple transceivers, and/or multiple antennas.

The wireless device 402 may also include a signal detector 418 that may be used to detect and quantify the level of signals received by the transceiver 414 or the receiver 412. The signal detector 418 may detect such signals as total energy, energy per subcarrier per symbol, power spectral density, and other signals. The wireless device 402 may also include a DSP 420 for use in processing signals. The DSP 420 may be configured to generate a packet for transmission. In some aspects, the packet may comprise a physical layer convergence procedure (PLCP) protocol data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

When the wireless device 402 is implemented as an AP (e.g., the AP 104), the wireless device 402 may also comprise a resource allocation component 424. The resource allocation component 424 may be configured to transmit, to a set of stations, a trigger frame (e.g., a trigger frame 434) that indicates a set of RUs for uplink transmission available to each station of the set of stations. The trigger frame may include a request for feedback on the set of RUs from each station. The resource allocation component 424 may be configured to receive from each station a response frame (e.g., a response frame 428) over an uplink resource based on the transmitted trigger frame. The response frame may include the feedback on the set of RUs and is received independent of a channel condition associated with the uplink resource. In one aspect, the channel condition may indicate that a channel associated with the uplink resource is busy based on one of a CCA determination at the station, a NAV setting at the station, an ED level being above a first threshold at the station, or a CQI being below a second threshold. The response frame from each station may be received on the uplink resource while the uplink resource/channel is busy. In another aspect, the feedback may be an ordered list of RUs based on the set of RUs. The ordered list of RUs may be ordered based on whether an RU of the set of RUs cleared a CCA or on a CQI preference of each station. In another configuration, the feedback may be an ordered list of RUs based on the set of RUs. The ordered list of RUs may be a subset of the set of resource units. In this configuration, the resource allocation component 424 may be configured to determine a subset of stations to be scheduled for uplink transmission based on the received response frame and on the ordered list of RUs indicated in the received response frame and to transmit a second trigger frame to the subset of stations indicating a subset of RUs allocated to each station in the subset of stations for uplink transmission. In another configuration, the resource allocation component 424 may be configured to determine the subset of stations by selecting the subset of stations based on the received response frame from each station of the set of stations, by determining at least one RU location based on the ordered list of RUs, and by determining at least one RU size based on the ordered list of RUs. In another configuration, the resource allocation component 424 may be configured to transmit a downlink multi-user frame (e.g., a downlink MU frame 432) before transmitting the second trigger frame.

The various components of the wireless device 402 may be coupled together by a bus system 426. The bus system 426 may include a data bus, for example, as well as a power bus, a control signal bus, and a status signal bus in addition to the data bus. Components of the wireless device 402 may be coupled together or accept or provide inputs to each other using some other mechanism.

Although a number of separate components are illustrated in FIG. 4, one or more of the components may be combined or commonly implemented. For example, the processor 404 may be used to implement not only the functionality described above with respect to the processor 404, but also to implement the functionality described above with respect to the signal detector 418, the DSP 420, the user interface 422, and/or the resource allocation component 424. Further, each of the components illustrated in FIG. 4 may be implemented using a plurality of separate elements.

Figure 5:
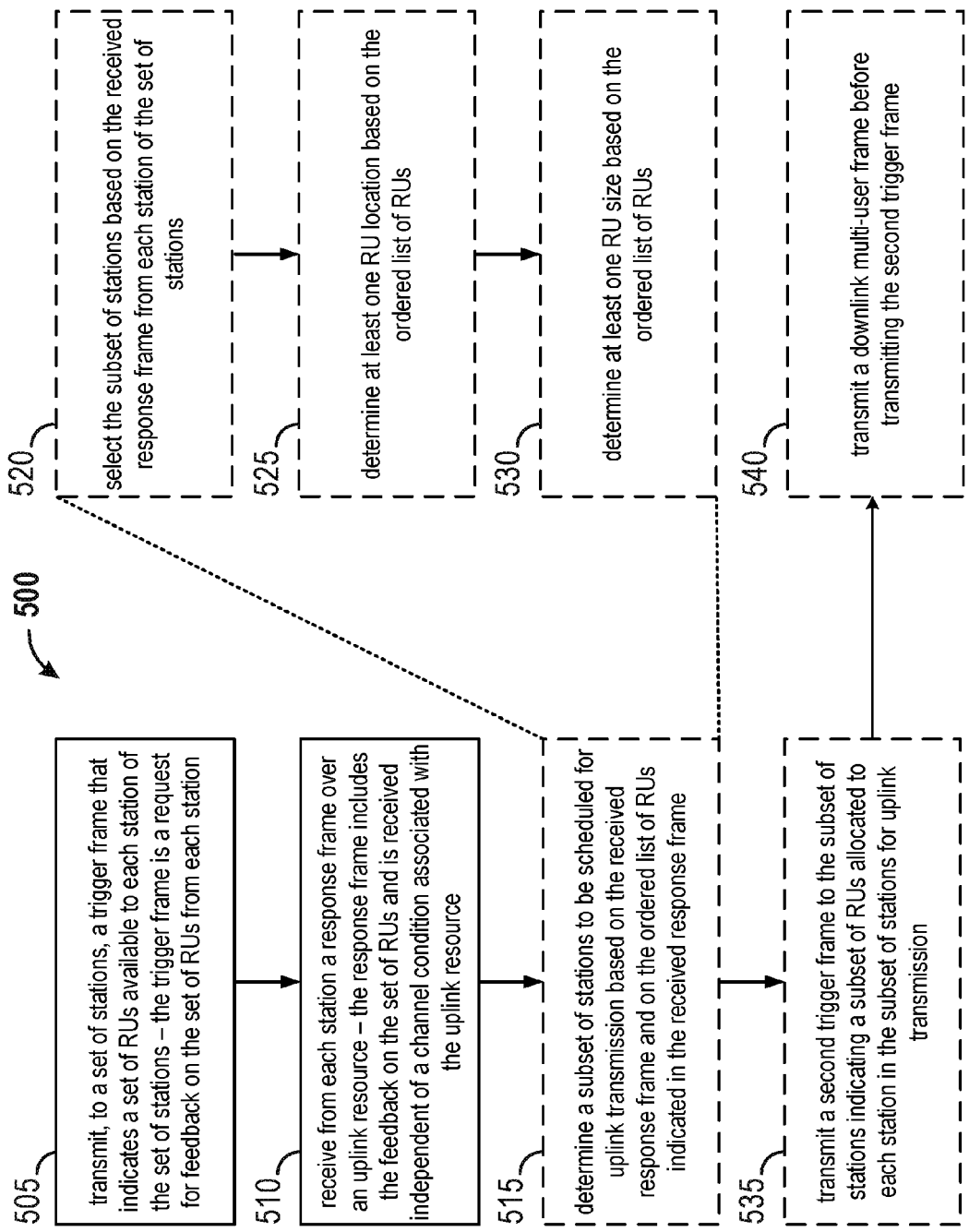
FIG. 5 is a flowchart of an example method of resource allocation based on resource unit feedback.

FIG. 5 is a flowchart of an example method 500 of resource allocation based on resource unit feedback. The method 500 may be performed using an apparatus (e.g., the AP 104, or the wireless device 402, for example). Although the method 500 is described below with respect to the elements of wireless device 402 of FIG. 4, other components may be used to implement one or more of the steps described herein. The dotted lines in FIG. 5 may indicate optional operations.

At block 505, the apparatus may transmit, to a set of stations, a control frame (e.g., a trigger frame) that indicates a set of RUs available to each station of the set of stations. The control frame may be a request for feedback on the set of RUs from each station. For example, referring to FIG. 2, the apparatus may be the AP and the set of stations may be STAs 1-8. At 202, the AP may transmit to the STAs 1-8 a first trigger frame (e.g., the control frame) that indicates a set of RUs available to each of the STAs 1-8. The first trigger frame may be a request for feedback on the set of RUs from each of the STAs 1-8. For example, the first trigger frame may include a feedback request bit that is set to 1.

At block 510, the apparatus may receive from each station a response frame over an uplink resource. The response frame may include the feedback on the set of RUs and may be received independent of a channel condition associated with the uplink resource. The feedback may be an ordered list of RUs based on the set of RUs indicated in the control frame. The channel condition may indicate that a channel associated with the uplink resource is busy based on one of a CCA determination, a NAV setting, an ED level being above a first threshold, or a CQI being below a second threshold. In an aspect, the response frame from each station may be received on the respective uplink resource while the channel is busy. In another aspect, the ordered list of RUs may be ordered based on whether an RU of the set of RUs cleared a CCA or on a CQI preference of each station. For example, referring to FIG. 2, the AP may receive from each of the STAs at 204 a control response frame over a respective uplink resource. The control response frame may include feedback on the set of RUs, and the feedback may be an ordered list of one or more. The control response frame may be received independent of a channel condition associated with the uplink resource. For example, when the AP receives the control response frame from STA 1, the STA 1 may transmit the control response frame on the uplink resource even when the uplink resource does not clear CCA. The AP may also receive control response frames from STAs 2-8.

At 515, the apparatus may determine a subset of stations to be scheduled for uplink transmission based on the received response frame and on the ordered list of RUs indicated in the received response frame. In an aspect, the apparatus may determine the subset of stations by selecting the subset of stations based on the received response frame from each station of the set of stations (at 520), by determining at least one RU location (e.g., a symbol location) based on the ordered list of RUs, and by determining at least one RU size (e.g., 20 megahertz (MHz), 40 MHz, 80 MHz, 160 MHz, etc.) based on the ordered list of RUs. For example, referring to FIG. 2, based on the control response frames (e.g., C-RP1-8) received from the STAs 1-8, the AP may determine that STAs 1, 3, 4, 6, 8 are scheduled for uplink transmission. The determination may be based on the control response frames from the STAs 1, 3, 4, 6, 8 indicating that the STAs 1, 3, 4, 6, 8 were allocated RUs that cleared CCA. The AP may determine RU locations and RU sizes (e.g., symbol locations and communication bandwidth size).

At 535, the apparatus may transmit a second control frame to the subset of stations indicating a subset of RUs allocated to each station in the subset of stations for uplink transmission. For example, referring to the FIG. 2, the AP may transmit the second trigger frame to STAs 1, 3, 4, 6, 8 indicating a subset of RUs allocated to each of the STAs for UL MU transmission.

At 540, the apparatus may transmit a downlink MU frame before transmitting the second control frame. For example, referring to FIG. 2, specifically diagram 250, the AP may transmit the DL MU frame to STAs 1, 3, 4, 6, 8 before transmitting the second trigger frame. In an aspect, the AP may transmit the DL MU frame first to provide the AP more time to generate the second trigger frame.

Figure 6:
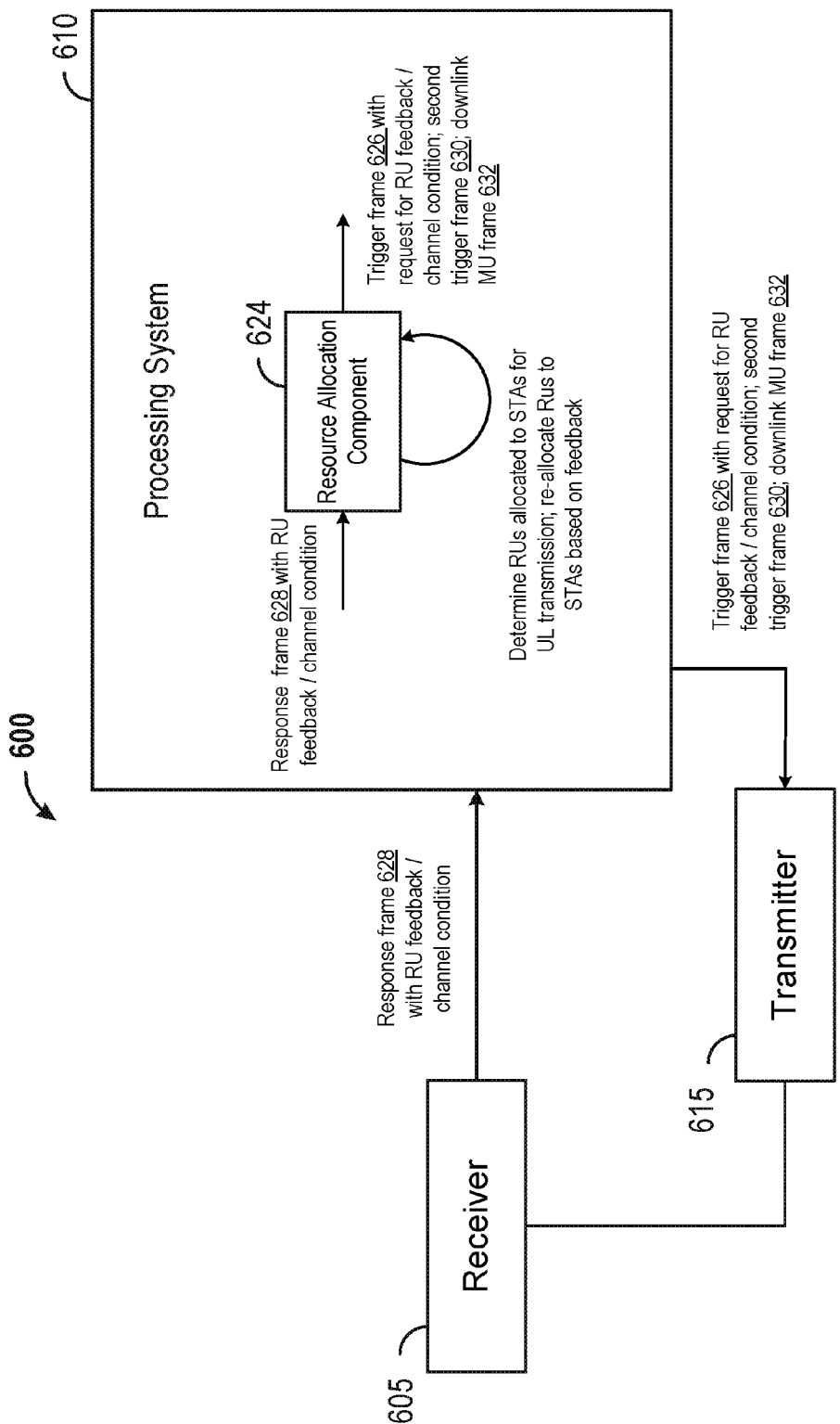
FIG. 6 is a functional block diagram of an example wireless communication device that may perform resource allocation based on feedback.

FIG. 6 is a functional block diagram of an example wireless communication device 600 that may perform resource allocation based on feedback. The wireless communication device 600 may include a receiver 605, a processing system 610, and a transmitter 615. The processing system 610 may include a resource allocation component

624. The processing system 610, the resource allocation component 624, and/or the transmitter 615 may be configured to transmit, to a set of stations, a trigger frame (e.g., a trigger frame 626) that indicates a set of RUs for uplink transmission available to each station of the set of stations. The trigger frame may include a request for feedback on the set of RUs from each station. The processing system 610, the resource allocation component 624, and/or the receiver 605 may be configured to receive from each station a response frame (e.g., a response frame 628) over an uplink resource based on the transmitted trigger frame. The response frame may include the feedback on the set of RUs and is received independent of a channel condition associated with the uplink resource. In one aspect, the channel condition may indicate that a channel associated with the uplink resource is busy based on one of a CCA determination at the station, a NAV setting at the station, an ED level being above a first threshold at the station, or a CQI being below a second threshold. The response frame from each station may be received on the uplink resource while the uplink resource/channel is busy. In another aspect, the feedback may be an ordered list of RUs based on the set of RUs. The ordered list of RUs may be ordered based on whether an RU of the set of RUs cleared a CCA or on a CQI preference of each station. In another configuration, the feedback may be an ordered list of RUs based on the set of RUs. The ordered list of RUs may be a subset of the set of resource units. In this configuration, the processing system 610 and/or the resource allocation component 624 may be configured to determine a subset of stations to be scheduled for uplink transmission based on the received response frame and on the ordered list of RUs indicated in the received response frame and to transmit a second trigger frame to the subset of stations indicating a subset of RUs allocated to each station in the subset of stations for uplink transmission. In another configuration, the processing system 610 and/or the resource allocation component 624 may be configured to determine the subset of stations by selecting the subset of stations based on the received response frame from each station of the set of stations, by determining at least one RU location based on the ordered list of RUs, and by determining at least one RU size based on the ordered list of RUs. In another configuration, the processing system 610, the resource allocation component 624, and/or the transmitter 615 may be configured to transmit a downlink multi-user frame (e.g., a downlink MU frame 632) before transmitting the second trigger frame.

The receiver 605, the processing system 610, the resource allocation component 624, and/or the transmitter 615 may be configured to perform one or more functions discussed above with respect to blocks 505, 510, 515, 520, 525, 530, 535, and 540 of FIG. 5. The receiver 605 may correspond to the receiver 412. The processing system 610 may correspond to the processor 404. The transmitter 615 may correspond to the transmitter 410. The resource allocation component 624 may correspond to the resource allocation component 124 and/or the resource allocation component 424.

In one configuration, the wireless communication device 600 may include means for transmitting, to a set of stations, a trigger frame that indicates a set of RUs for uplink transmission available to each station of the set of stations. The trigger frame may include a request for feedback on the set of RUs from each station. The wireless communication device 600 may include means for receiving from each station a response frame over an uplink resource based on the transmitted trigger frame. The response frame may include the feedback on the set of RUs and is received independent of a channel condition associated with the uplink resource. In one aspect, the channel condition may indicate that a channel associated with the uplink resource is busy based on one of a CCA determination at the station, a NAV setting at the station, an ED level being above a first threshold at the station, or a CQI being below a second threshold. The response frame from each station may be received on the uplink resource while the uplink resource/channel is busy. In another aspect, the feedback may be an ordered list of RUs based on the set of RUs. The ordered list of RUs may be ordered based on whether an RU of the set of RUs cleared a CCA or on a CQI preference of each station. In another configuration, the feedback may be an ordered list of RUs based on the set of RUs. The ordered list of RUs may be a subset of the set of resource units. In this configuration, the wireless communication device 600 may include means for determining a subset of stations to be scheduled for uplink transmission based on the received response frame and on the ordered list of RUs indicated in the received response frame and to transmit a second trigger frame to the subset of stations indicating a subset of RUs allocated to each station in the subset of stations for uplink transmission. In another configuration, the means for determining the subset of stations may be configured to select the subset of stations based on the received response frame from each station of the set of stations, to determine at least one RU location based on the ordered list of RUs, and to determine at least one RU size based on the ordered list of RUs. In another configuration, the wireless communication device 600 may include mean for transmitting a downlink multi-user frame (e.g., a downlink MU frame 632) before transmitting the second trigger frame.

For example, means for transmitting a trigger frame may include the processing system 610, the resource allocation component 624, and/or the transmitter 615. Means for receiving may include the processing system 610, the resource allocation component 624, and/or the receiver 605. Means for determining a subset of station may include the processing system 610 and/or the resource allocation component 624. Means for transmitting a second trigger frame may include the processing system 610, the resource allocation component 624, and/or the transmitter 615. Means for transmitting a downlink multi-user frame may include the processing system 610, the resource allocation component 624, and/or the transmitter 615.

Figure 7:
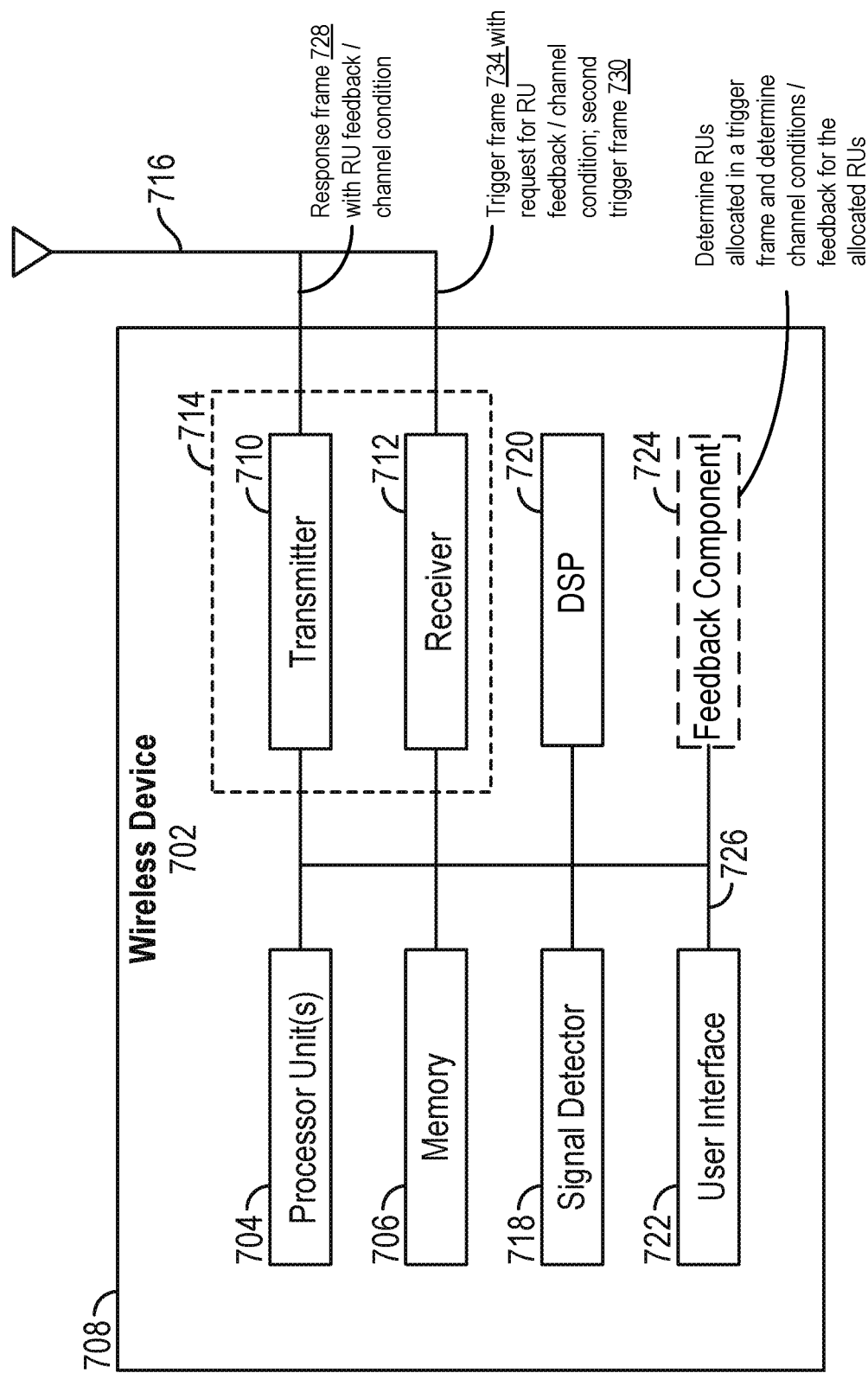
FIG. 7 shows an example functional block diagram of a wireless device providing resource unit feedback that may be employed within the wireless communication system of FIG. 1.

FIG. 7 shows an example functional block diagram of a wireless device 702 providing resource unit feedback that may be employed within the wireless communication system 100 of FIG. 1. The wireless device 702 is an example of a device that may be configured to implement the various methods described herein. For example, the wireless device 702 may comprise the STA 114.

The wireless device 702 may include a processor 704 which controls operation of the wireless device 702. The processor 704 may also be referred to as a CPU. Memory 706, which may include both ROM and RAM, may provide instructions and data to the processor 704. A portion of the memory 706 may also include NVRAM. The processor 704 typically performs logical and arithmetic operations based on program instructions stored within the memory 706. The instructions in the memory 706 may be executable (by the processor 704, for example) to implement the methods described herein.

The processor 704 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 702 may also include a housing 708, and the wireless device 702 may include a transmitter 710 and/or a receiver 712 to allow transmission and reception of data between the wireless device 702 and a remote device. The transmitter 710 and the receiver 712 may be combined into a transceiver 714. An antenna 716 may be attached to the housing 708 and electrically coupled to the transceiver 714. The wireless device 702 may also include multiple transmitters, multiple receivers, multiple transceivers, and/or multiple antennas.

The wireless device 702 may also include a signal detector 718 that may be used to detect and quantify the level of signals received by the transceiver 714 or the receiver 712. The signal detector 718 may detect such signals as total energy, energy per subcarrier per symbol, power spectral density, and other signals. The wireless device 702 may also include a DSP 720 for use in processing signals. The DSP 720 may be configured to generate a packet for transmission. In some aspects, the packet may comprise a PPDU.

The wireless device 702 may further comprise a user interface 722 in some aspects. The user interface 722 may comprise a keypad, a microphone, a speaker, and/or a display. The user interface 722 may include any element or component that conveys information to a user of the wireless device 702 and/or receives input from the user.

When the wireless device 702 is implemented as a STA (e.g., the STA 114), the wireless device 702 may also comprise a feedback component 724. The feedback component 724 may be configured to receive from an access point a trigger frame (e.g., a trigger frame 734) that indicates a set of RUs available to the station for uplink transmission. The trigger frame may be a request for feedback on the set of RUs. The feedback component 724 may be configured to determine feedback on the set of RUs based on channel conditions associated with the set of RUs indicated in the trigger frame. The feedback component 724 may be configured to transmit a response frame (e.g., a response frame 728) on an uplink resource allocated to the station. The response frame may include the determined feedback and may be transmitted independent of a channel condition associated with the uplink resource. In one configuration, the feedback component 724 may be configured to determine the feedback by determining a respective channel condition associated with each RU of the set of RUs. The respective channel condition may be based on a CCA determination, a NAV setting, or CQI. In this configuration, the feedback component 724 may be further configured to determine a list of RUs ordered based on the respective channel condition associated with each RU of the set of RUs. In another configuration, the feedback component 724 may be further configured to determine the feedback by determining a preferred MCS for at least one RU in the set of RUs. In an aspect, the channel condition associated with the uplink resource may indicate a channel associated with the uplink resource is busy based on one of a CCA determination, a NAV setting, an ED level being above a first threshold, or a CQI being below a second threshold. In this aspect, the response frame may be transmitted on the uplink resource while the channel is busy. In another configuration, the feedback component 724 may be configured to receive a second trigger frame (e.g., a second trigger frame 730) indicating a subset of RUs allocated to the station for uplink transmission. The subset of RUs may be based on the determined feedback transmitted to the access point.

The various components of the wireless device 702 may be coupled together by a bus system 726. The bus system 726 may include a data bus, for example, as well as a power bus, a control signal bus, and a status signal bus in addition to the data bus. Components of the wireless device 702 may be coupled together or accept or provide inputs to each other using some other mechanism.

Although a number of separate components are illustrated in FIG. 7, one or more of the components may be combined or commonly implemented. For example, the processor 704 may be used to implement not only the functionality described above with respect to the processor 704, but also to implement the functionality described above with respect to the signal detector 718, the DSP 720, the user interface 722, and/or the feedback component 724. Further, each of the components illustrated in FIG. 7 may be implemented using a plurality of separate elements.

Figure 8:
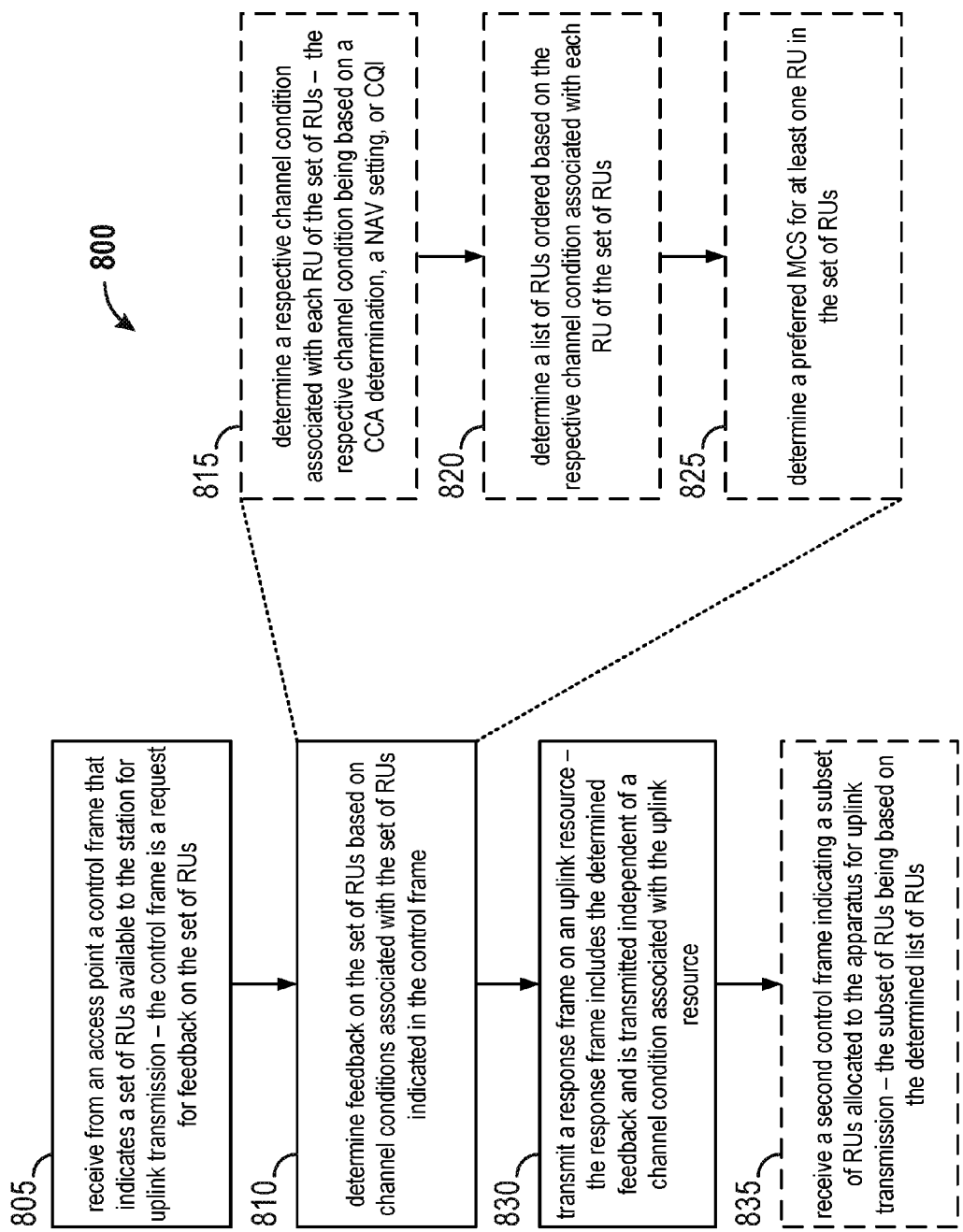
FIG. 8 is a flowchart of an example method of providing feedback on available resource units for MU transmission.

FIG. 8 is a flowchart of an example method 800 of providing feedback on available resource units for MU transmission. The method 800 may be performed using an apparatus (e.g., the STA 114, or the wireless device 702, for example). Although the method 800 is described below with respect to the elements of wireless device 702 of FIG. 7, other components may be used to implement one or more of the steps described herein. The dotted lines in FIG. 8 may represent optional operations.

At block 805, the apparatus may receive from an access point a control frame that indicates a set of RUs available to the station for uplink transmission. The control frame may be a request for feedback on the set of RUs. For example, referring to FIG. 2, the apparatus may be the STA 1. The STA 1 may receive from the AP a first trigger frame that indicates a set of RUs available to the STA 1 for uplink and/or downlink transmission. The first trigger message is a request for feedback on the set of RUs.

At block 810, the apparatus may determine feedback on the set of RUs based on channel conditions associated with the set of RUs indicated in the control frame. In an aspect, the apparatus may determine feedback by determining a respective channel condition associated with each RU of the set of RUs (at 815), the respective channel condition being based on a CCA determination, a NAV setting, or CQI, by determining a list of RUs ordered based on the respective channel condition associated with each RU of the set of RUs (at 820), and/or by determining a preferred MCs for at least one RU to be used for DL communication (at 825). For example, referring to FIG. 2, the STA 1 may determine feedback on the set of RUs available to the STA 1 by determining whether each RU in the set of RUs clears CCA. For the RUs that cleared CCA, the STA 1 may measure the CQI on the RUs and determine a list the RUs in decreasing order of channel quality.

At block 830, the apparatus may transmit a response frame on an uplink resource. The response frame may include the determined feedback and may be transmitted independent of a channel condition associated with the uplink resource. For example, referring to FIG. 2, the STA 1 may transmit a control response frame on the uplink resource, which may be indicated in the first trigger frame. The control response frame may include the ordered list of RU and may be transmitted independent of the channel condition associated with the uplink resource. In an aspect, the control response frame may be transmitted even when the channel condition indicates that the channel is busy (e.g., the uplink resource does not clear CCA).

At block 835, the apparatus may receive a second control frame indicating a subset of RUs allocated to the apparatus for uplink transmission. The subset of RUs may be based on the determined feedback transmitted to the access point (e.g., the ordered list of RUs). For example, referring to FIG. 2, the STA 1 may receive the second trigger frame that indicates a subset of RUs allocated to the STA 1 for UL MU transmission. The subset of RUs may be based on the list of ordered RUs transmitted to the AP.

Figure 9:
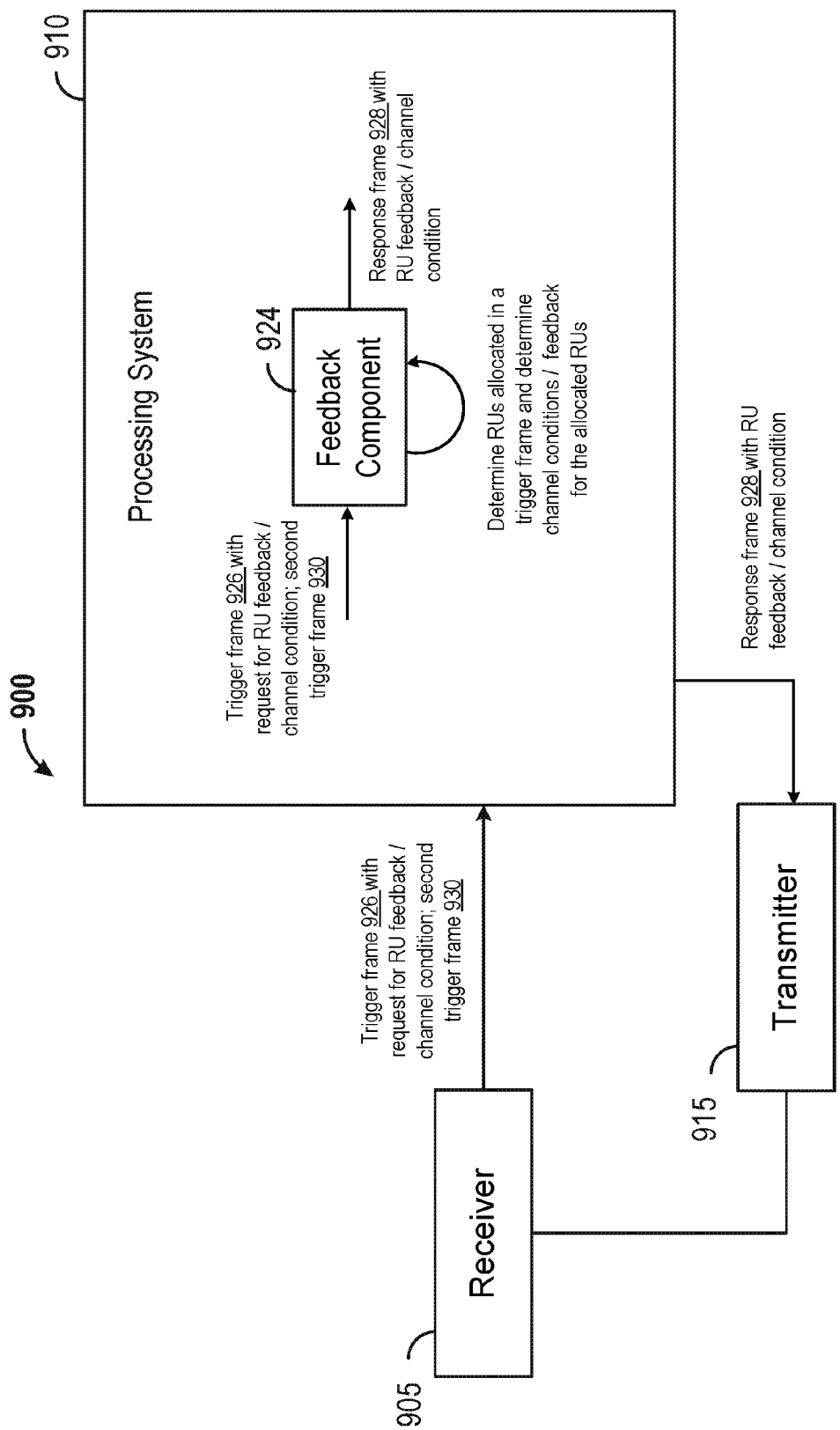
FIG. 9 is a functional block diagram of an example wireless communication device for providing resource unit feedback.

FIG. 9 is a functional block diagram of an example wireless communication device 900 for providing resource unit feedback. The wireless communication device 900 may include a receiver 905, a processing system 910, and a transmitter 915. The processing system 910 may include a feedback component 924. The processing system 910, the feedback component 924, and/or the receiver 905 may be configured to receive from an access point a trigger frame (e.g., a trigger frame 926) that indicates a set of RUs available to the station for uplink transmission. The trigger frame may be a request for feedback on the set of RUs. The processing system 910 and/or the feedback component 924 may be configured to determine feedback on the set of RUs based on channel conditions associated with the set of RUs indicated in the trigger frame. The processing system 910, the feedback component 924, and/or the transmitter 915 may be configured to transmit a response frame (e.g., a response frame 928) on an uplink resource allocated to the station. The response frame may include the determined feedback and may be transmitted independent of a channel condition associated with the uplink resource. In one configuration, the processing system 910 and/or the feedback component 924 may be configured to determine the feedback by determining a respective channel condition associated with each RU of the set of RUs. The respective channel condition may be based on a CCA determination, a NAV setting, or CQI. In this configuration, the processing system 910 and/or the feedback component 924 may be further configured to determine a list of RUs ordered based on the respective channel condition associated with each RU of the set of RUs. In another configuration, the processing system 910 and/or the feedback component 924 may be further configured to determine the feedback by determining a preferred MCS for at least one RU in the set of RUs. In an aspect, the channel condition associated with the uplink resource may indicate a channel associated with the uplink resource is busy based on one of a CCA determination, a NAV setting, an ED level being above a first threshold, or a CQI being below a second threshold. In this aspect, the response frame may be transmitted on the uplink resource while the channel is busy. In another configuration, the processing system 910, the feedback component 924, and/or the receiver 905 may be configured to receive a second trigger frame (e.g., a second trigger frame 930) indicating a subset of RUs allocated to the station for uplink transmission. The subset of RUs may be based on the determined feedback transmitted to the access point.

The receiver 905, the processing system 910, the feedback component 924, and/or the transmitter 915 may be configured to perform one or more functions discussed above with respect to blocks 805, 810, 815, 820, 825, 830, and 835 of FIG. 8. The receiver 905 may correspond to the receiver 712. The processing system 910 may correspond to the processor 704. The transmitter 915 may correspond to the transmitter 710. The feedback component 924 may correspond to the feedback component 126 and/or the feedback component 724.

In one configuration, the wireless communication device 900 may include means for receiving from an access point a trigger frame that indicates a set of RUs available to the station for uplink transmission. The trigger frame may be a request for feedback on the set of RUs. The wireless communication device 900 may include means for determining feedback on the set of RUs based on channel conditions associated with the set of RUs indicated in the trigger frame. The wireless communication device 900 may include means for transmitting a response frame on an uplink resource allocated to the wireless communication device 900. The response frame may include the determined feedback and may be transmitted independent of a channel condition associated with the uplink resource. In one configuration, the means for determining the feedback may be configured to determine a respective channel condition associated with each RU of the set of RUs. The respective channel condition may be based on a CCA determination, a NAV setting, or CQI. In this configuration, the means for determining may be further configured to determine a list of RUs ordered based on the respective channel condition associated with each RU of the set of RUs. In another configuration, the means for determining the feedback may be configured to determine a preferred MCS for at least one RU in the set of RUs. In an aspect, the channel condition associated with the uplink resource may indicate a channel associated with the uplink resource is busy based on one of a CCA determination, a NAV setting, an ED level being above a first threshold, or a CQI being below a second threshold. In this aspect, the response frame may be transmitted on the uplink resource while the channel is busy. In another configuration, the wireless communication device 900 may include means for receiving a second trigger frame (e.g., a second trigger frame 730) indicating a subset of RUs allocated to the station for uplink transmission. The subset of RUs may be based on the determined feedback transmitted to the access point.

For example, means for receiving from an access point a trigger frame may include the processing system 910, the feedback component 924, and/or the receiver 905. Means for determining feedback may include the processing system 910 and/or the feedback component 924. Means for transmitting a response frame may include the processing system 910, the feedback component 924, and/or the transmitter 915. Means for receiving a second trigger frame may include the processing system 910, the feedback component 924, and/or the receiver 905.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by an apparatus, comprising:
    generating, for transmission to a set of stations, a first frame that indicates a set of resource units (RUs) available for transmission to each station of the set of stations, wherein the first frame comprises a request for feedback on the set of RUs from each station;
    outputting, for transmission to the set of stations, the first frame; and
    obtaining, from each station, a response frame based on the first frame, wherein the response frame includes a bitmap indicating the feedback on the set of RUs.

2. The method of claim 1, wherein a channel condition associated with an RU of the set of RUs indicates that a channel associated with the RU of the set of RUs is busy based on one of a clear channel assessment (CCA) determination, a network allocation vector (NAV) setting, an energy detection (ED) level being above a first threshold, or a channel quality information (CQI) being below a second threshold, and wherein the response frame from each station is obtained on the RU of the set of RUs while the channel is busy.

3. The method of claim 1, further comprising:
    determining a subset of stations to be scheduled for transmission based on the bitmap indicating the feedback on the set of RUs;

generating a second frame for transmission to the subset of stations indicating a subset of RUs allocated to each station in the subset of stations for transmission; and outputting the second frame for transmission to the subset of stations.

4. The method of claim 1, wherein the bitmap is an ordered list of RUs based on the set of RUs and, wherein the ordered list of RUs is a subset of the set of RUs, the method further comprising:

determining a subset of stations to be scheduled for transmission based on the ordered list of RUs;

allocating a subset of RUs to each station in the subset of stations based on the ordered list of RUs;

generating a second frame for transmission to the subset of stations indicating the subset of RUs allocated to each station in the subset of stations for transmission; and outputting the second frame for transmission to the subset of stations.

5. The method of claim 4, wherein the determining the subset of stations comprises:

selecting the subset of stations based on the ordered list of RUs, and the allocating the subset of RUs comprises:

determining at least one RU location based on the ordered list of RUs; and determining at least one RU size based on the ordered list of RUs, wherein the subset of RUs allocated to each station is based on at least one of the at least one RU location or the at least one RU size.

6. The method of claim 4, further comprising:

generating a multi-user frame and outputting the multi-user frame for transmission before transmission of the second frame.

7. The method of claim 1, wherein the first frame comprises a value indicating the request for feedback on the set of RUs from each station.

8. The method of claim 1, wherein, for at least one RU of the set of RUs, the bitmap indicates one of a first value if the at least one RU is available or a second value if the at least one RU is unavailable.

9. An apparatus for wireless communication comprising:

a processing system configured to:

generate a first frame to be transmitted to a set of stations, wherein the first frame indicates a set of resource units (RUs) available for transmission to each station of the set of stations, and wherein the first frame comprises a request for feedback on the set of RUs from each station, and obtain, from each station, a response frame based on the first frame, wherein the response frame includes a bitmap indicating the feedback on the set of RUs; and a bus system configured to provide the first frame for transmission and obtain the response frame.

10. The apparatus of claim 9, wherein a channel condition associated with an RU of the set of RUs indicates that a channel associated with an RU of the set of RUs is busy based on one of a clear channel assessment (CCA) determination, a network allocation vector (NAV) setting, an energy detection (ED) level being above a first threshold, or a channel quality information (CQI) being below a second threshold, and wherein the response frame from each station is obtained on the RU of the set of RUs while the channel is busy.

11. The apparatus of claim 9, wherein the processing system is further configured to:

determine a subset of stations to be scheduled for transmission based on the bitmap indicating the feedback on the set of RUs;

generate a second frame for transmission to the subset of stations indicating a subset of RUs allocated to each station in the subset of stations for transmission; and output the second frame for transmission to the subset of stations.

12. The apparatus of claim 9, wherein the bitmap is an ordered list of RUs based on the set of RUs and, wherein the ordered list of RUs is a subset of the set of RUs, the processing system is further configured to:

determine a subset of stations to be scheduled for transmission based on the ordered list of RUs;

allocate a subset of RUs to each station in the subset of stations based on the ordered list of RUs; and generate a second frame to be transmitted to the subset of stations indicating the subset of RUs allocated to each station in the subset of stations for transmission.

13. The apparatus of claim 12, wherein to determine the subset of stations, the processing system is configured to:

select the subset of stations based on the ordered list of RUs, and wherein to allocate the subset of RUs, the processing system is configured to:

determine at least one RU location based on the ordered list of RUs; and determine at least one RU size based on the ordered list of RUs, the subset of RUs allocated to each station being based on at least one of the at least one RU location or the at least one RU size.

14. The apparatus of claim 12, wherein the processing system is further configured to:

generate a multi-user frame; and output the multi-user frame for transmission before the transmission of the second frame.

15. The apparatus of claim 9, wherein the first frame comprises a value indicating the request for feedback on the set of RUs from each station.

16. The apparatus of claim 9, wherein, for at least one RU of the set of RUs, the bitmap indicates one of a first value if the at least one RU is available or a second value if the at least one RU is unavailable.

17. An access point comprising:

a processing system configured to:

generate a first frame to be transmitted to a set of stations, wherein the first frame indicates a set of resource units (RUs) available for transmission to each station of the set of stations, and wherein the first frame comprises a request for feedback on the set of RUs from each station;

a transmitter configured to transmit the first frame; and a receiver configured to receive, from each station, a response frame based on the first frame, wherein the response frame includes a bitmap indicating the feedback on the set of RUs.

* * * * *